(12) United States Patent
Kishi et al.

(10) Patent No.: US 6,866,500 B2
(45) Date of Patent: Mar. 15, 2005

(54) CLAMPING APPARATUS (75) Inventors: Shinsuke Kishi, Saitama (JP);
Kazuhiro Miura, Shizuoka (JP);
Osamu Matsuura, Shizuoka (JP)

(73) Assignee: Sony Corporation (JP)

( * ) Notice: Subject to any disclaimer, the term of this patent is extended or adjusted under 35 U.S.C. 154(b) by 204 days.

(21) Appl. No.: 10/267,640

(22) Filed: Oct. 10, 2002

(65) Prior Publication Data

US 2003/0082260 A1 May 1, 2003

(30) Foreign Application Priority Data

Oct. 17, 2001 (JP) .................................... P2001-319618

(51) Int. Cl.⁷ ............................................. B29C 45/64
(52) U.S. Cl. .................................. 425/589; 425/450.1
(58) Field of Search .............................. 425/589, 450.1

(56) References Cited

U.S. PATENT DOCUMENTS

| 3,669,599 | A | * | 6/1972 | Snider et al. | ............... 425/595 |
| 3,674,400 | A | * | 7/1972 | Sauerbruch et al. | ........ 425/225 |
| 3,841,823 | A | * | 10/1974 | Hehl | ........................ 425/450.1 |
| 4,094,621 | A | * | 6/1978 | Hehl | ........................ 425/450.1 |
| 4,235,575 | A | * | 11/1980 | Hehl | .......................... 425/107 |
| 4,315,728 | A | * | 2/1982 | Hehl | .......................... 425/589 |
| 4,453,912 | A | * | 6/1984 | Hehl | .......................... 425/589 |
| 5,910,328 | A | * | 6/1999 | Oshiro et al. | ............... 425/595 |
| 6,290,482 | B1 | * | 9/2001 | Glaesener et al. | .......... 425/589 |

\* cited by examiner

*Primary Examiner*—James P. Mackey
(74) *Attorney, Agent, or Firm*—Rader, Fishman & Grauer PLLC; Ronald P. Kananen (57) ABSTRACT

A clamping apparatus includes a fixed die plate (21) fixed to a frame (26), four tie rods (23), (24) extending in the horizontal direction and respectively fixed to the fixed die plate (21) in parallel to each other, a moving die plate (22) supported to the four tie rods (23), (24) so that the moving die plate (22) can slide freely and a clamping mechanism for moving the moving die plate (22) forward and backward along the four tie rods (23), (24). This clamping apparatus comprises a guide mechanism (25) for downwardly or upwardly supporting the moving die plate (22) and which allows the moving die plate (22) to move in the opposite direction of gravitation.

1 Claim, 6 Drawing Sheets

CLAMPING APPARATUS

BACKGROUND OF THE INVENTION

1. Field of the Invention

The present invention generally relates to a clamping apparatus including a fixed die plate and a moving die plate opposed to each other in the horizontal direction to open and close a die by moving the moving die plate forward and backward along tie rods supported to the fixed die plate and, particularly, to a clamping apparatus in which a moving die plate can move forward and backward smoothly with reliability and in which clamping accuracy can be prevented from being deteriorated even when a load is applied to one side of the moving die plate.

2. Description of the Related Art

According to the related art, a clamping apparatus for use in a horizontal injection-molding machine comprises a fixed die plate fixed to a frame, a plurality of tie rods extending in the horizontal direction and respectively supported to the fixed die plate in parallel to each other, a moving die plate supported to a plurality of tie rods so as to slide freely and a clamping mechanism for moving the moving die plate forward and backward along a plurality of tie rods.

The fixed die plate is composed of a square block-like member, and two to four tie rods are mounted to a plurality of portions of the fixed die plate. In the case of a clamping apparatus using four tie rods, for example, respective ends of the four tie rods are fixed to four corners of the fixed die plate. The four tie rods are parallel to each other and extend in the horizontal direction such that they may extend through the moving die plate so as to slide freely. A drive mechanism of a suitable drive system such as a direct pressure system, or a toggle system comprising a hydraulic cylinder, is coupled to the moving die plate to move the moving die plate forward and backward. When this drive mechanism operates, the moving die plate moves back and forth along the four tie rods to open and close a pair of dies fixed to the fixed die plate and the moving die plate.

However, in the clamping apparatus according to the related art, two to four tie rods are inserted into bushes of the moving die plate, and the moving die plate is supported so as to slide freely in the horizontal direction by the engagement state among the tie rods and the bushes for supporting these tie rods. For this reason, because the outer peripheral surface of the tie rod and the inner peripheral surface of the bush cannot contact with each other highly uniformly without difficulty, it is difficult or impossible to move the moving die plate smoothly and parallelly.

Specifically, in the clamping apparatus including the guide structure to guide the moving die plate by the engagement among a plurality of bushes on the moving die plate and a plurality of tie rods extending through these bushes, it is difficult or impossible to bring the outer peripheral surface of each tie rod and the inner peripheral surface of each bush in uniform contact with each other, with the result that the moving die plate cannot move smoothly and parallelly. Moreover, it also is impossible to adjust the parallelism of the moving die plate.

With respect to this point, there is considered a countermeasure for increasing the accuracy of the work of assemblies to make the outer peripheral surface of each tie rod contact with the inner peripheral surface of each bush uniformly. When the accuracy of the work of assemblies increases, it is unavoidable that the tie rod is deformed due to the weight of the moving die plate, and the moving die plate is deformed due to external causes such as the influences of heat conveyed from the die or a pitch between the bushes is changed due to thermal expansion of the moving die plate. As a consequence, when the tie rods and the bushes are brought in contact with each other, they cannot contact with each other at their contact portions at all, or they are only brought in contact with each other at their contact portions in a line contact fashion, so that the moving die plate cannot move smoothly and parallelly.

Another countermeasure is a separate guide mechanism that can guide the moving die plate, for example. As this type of guide mechanism, there is known a guide mechanism that is generally referred to as a "linear motion guide" (often simply referred to as an "LM guide"). The related-art guide mechanism called a LM guide has the arrangement shown in FIGS. 1A and 1B.

Figure 1A:
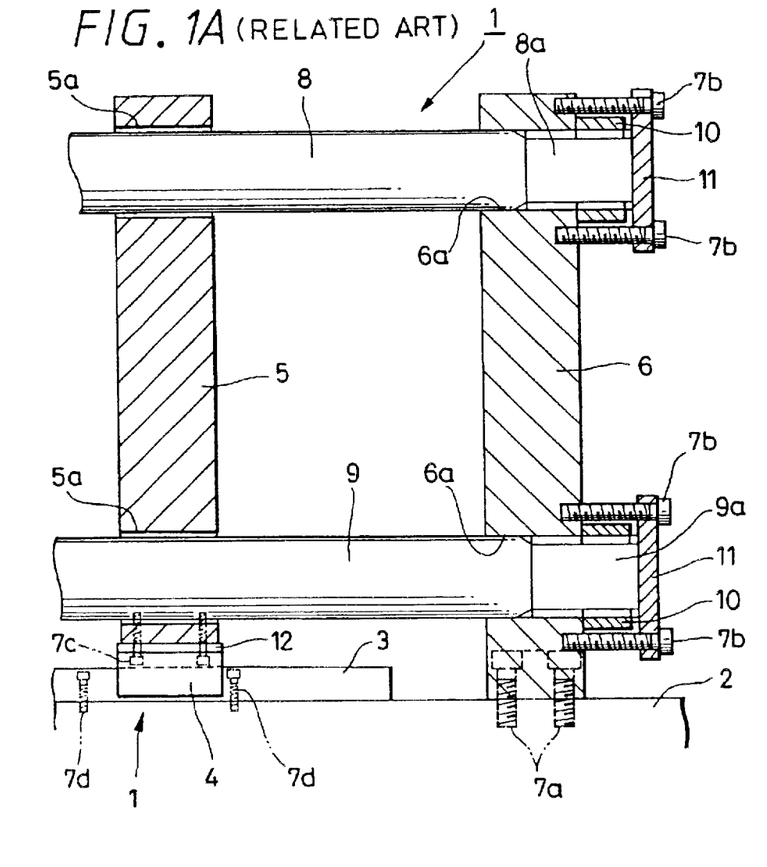
FIG. 1A is a front view showing a clamping apparatus according to the related art partly in a cross-sectional fashion.
Figure 1B:
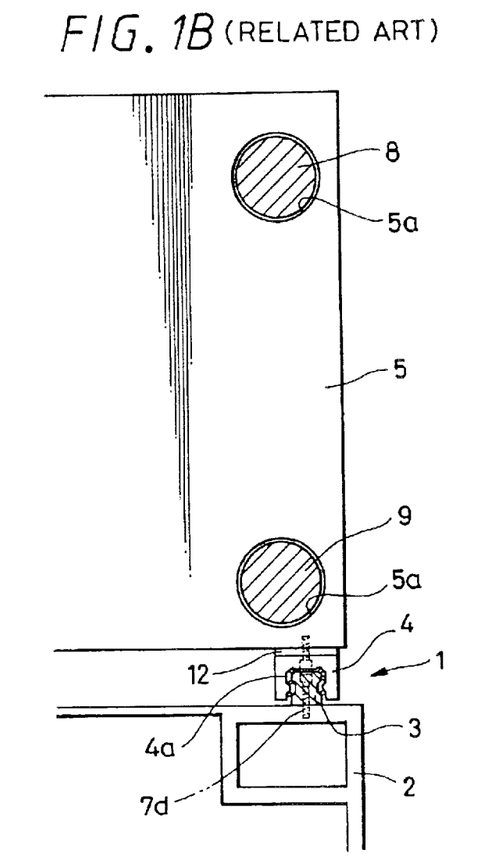
FIG. 1B is a side view showing a right-hand half of the clamping apparatus according to the related art in a partly cross-sectional fashion.

As shown in FIGS. 1A and 1B, a related-art guide mechanism, generally denoted by reference numeral 1, includes a guide rail 3 fixed to an upper surface of a frame 2 and a slider 4 that engages with the guide rail 3 so as to slide along the guide rail 3. Two guide mechanisms 1 composed of the guide rail 3 and the slider 4 are prepared for a moving guide plate 5, and the two guide mechanisms 1 support the moving die plate 5 such that the moving die plate 5 can move close to or away from a fixed die plate 6.

The fixed die plate 6 is composed of a square plate-like member erected on the upper surface of the frame 2 and fixed to the frame 2 by a plurality of fixed screws 7a. The fixed die plate 6 has insertion holes 6a defined at its four corners, and tic rods 8, 9 are inserted into the insertion holes 6a, respectively. Screw portions 8a, 9a are formed at one end of the tie rods 8, 9, and fixed nuts 10 are screwed down on the respective screw portions 8a, 9a. The ends of the tie rods 8, 9 are brought in contact with a fixed plate 11 supported by a plurality of attachment screws 7b.

The other ends of the four tie rods 8, 9 are elongated in the horizontal direction in parallel to each other, extended through bushes 5a of the moving die plate 5 and are fixed to the members of the frame 2 side. The moving die plate 5 is composed of a square plate-like member the size of which is approximately similar to that of the fixed die plate 6. The moving die plate 5 has the bushes 5a disposed at its four corners, and the tie rods 8, 9 are inserted into the bushes 5a with a predetermined clearance. The sliders 4 of the guide mechanisms 1 are downwardly attached to respective ends of the lower portion of the moving die plate 5, respectively.

The respective sliders 4 are fixed to the lower surface of the moving die plate 5 by a plurality of fixed screws 7c through an adjustment plate 12. The respective guide rails 3 are fixed to the upper surface of the frame 2 by a plurality of like fixed screws 7d. The guide rail 3 has a nearly gourd-like cross section in the width direction that crosses the longitudinal direction, and a guide groove 4a having a shape corresponding to the above gourd-like cross section is formed on the slider 4. The guide groove 4a and the guide rail 3 have a clearance of a predetermined spacing formed over approximately the whole peripheral surface thereof. This clearance has a large number of rolling elements interposed thereon, and these rolling elements can reduce frictional resistance generated between the guide rail 3 and the slider 4 to ensure that the slider 4 can move smoothly.

Since this guide mechanism 1, however, has no play to move except the direction in which it can move forwardly, the guide mechanism 1 can move smoothly in the forward direction, but it unavoidably increases frictional resistance in the directions other than the direction in which it proceeds. For this reason, even when the tie rods 8, 9 are brought in very slight contact with the bushes 5a as the moving die plate 5 is inclined a little, the guide mechanism 1 cannot move smoothly and moves clumsily. As a result, when the guide mechanism 1, such as the "LM guide", is in use, it is unavoidable that the clearance between the tie rods 8, 9 and the bushes 5a should increase.

However, when clamping force is applied to the clamping apparatus using only the above-mentioned guide mechanism 1 under the condition in which an undesired substance, such as a foreign matter, is held in the die, the parallelism between the moving die plate 5 and the fixed die plate 6 is easily deteriorated. Since such deteriorated parallelism produces defective products, the deteriorated parallelism should be returned to the original normal state. In such case, it takes plenty of extra time, such as an adjustment time for adjusting the deteriorated parallelism and a time for dismounting the die from the moving die plate 5 and the fixed die plate 6 or mounting the die to the moving die plate 5 and the fixed die plate 6 one more time. There arises a problem that the operating ratio will be lowered.

SUMMARY OF THE INVENTION

In view of the aforesaid aspects, it is an object of the present invention to provide a clamping apparatus in which a load applied to tie rods from a moving die plate can be alleviated or prevented.

It is another object of the present invention to provide a clamping apparatus in which the parallelism between a moving die plate and a fixed die plate can be prevented from being deteriorated even when a load is applied to one side of the moving die plate.

It is a further object of the present invention to provide a clamping apparatus in which parallelism or the like can be easily returned to the original normal state, even when a molded product is held by dies.

According to an aspect of the present invention, there is provided a clamping apparatus which is comprised of a fixed die plate fixed to a frame, a plurality of tie rods extending in the horizontal direction and respectively supported to the fixed die plate in parallel to each other, a moving die plate supported to a plurality of tie rods such that the moving die plate can slide freely, a clamping mechanism for moving the moving die plate forward and backward along a plurality of tie rods and a guide mechanism for downwardly or upwardly supporting the moving die plate and allowing the moving die plate to move in the opposite direction of gravitation.

According to another aspect of the present invention, there is provided a clamping apparatus, wherein the guide mechanism includes one or more than two first guide means composed of a combination of a first member having a wedge-like or semicircular projection portion and a second member having a V-like or semicircular recess portion that engages with the projection portion and one of the first member and the second member of the first guide means is fixed to the moving die plate and the other is fixed to the frame.

According to a further aspect of the present invention, there is provided a clamping apparatus, wherein the guide mechanism includes second guide means composed of one or more than two guide bushes that are suspended by more than two tie rods of a plurality of tie rods and the guide bushes of the second guide means are respectively fixed to the moving die plate in response to more than two tie rods.

Since the clamping apparatus according to the present invention has the above-mentioned arrangement, in the clamping apparatus including the fixed die plate, a plurality of tie rods, the moving die plate and the clamping mechanism, the guide mechanism can support the moving die plate downwardly or upwardly and can allow the moving die plate to move in the opposite side of gravitation. Thus, even then a load is applied to one side of the moving die plate, the parallelism between the moving die plate and the fixed die plate can be prevented from being deteriorated. Further, when a molded product is held between the dies, parallelism or the like can be easily returned to the original state.

In the clamping apparatus according to the present invention, since the first guide means includes the first member and the second member, the first member fixed to one of the moving die plate and the frame includes the wedge-like or semicircular projection portion and the second member fixed to the other of the moving die plate and the frame includes the V-like or semicircular recess portion, one or more than two first guide means composed of the first and second members can guide the moving die plate, and a load applied to the tie rods from the moving die plate can be alleviated or prevented. Thus, even when a load is applied to one side of the moving die plate, the parallelism between the moving die plate and the fixed die plate can be prevented from being deteriorated. Further, when a molded product is held between the dies, parallelism or the like can be easily returned to the original state.

In the clamping apparatus according to the present invention, since the second guide means is composed of guide bushes, the guide bushes are fixed to the moving die plate and the guide bushes are suspended by the tie rods such that the moving die plate is guided, even when a load is applied to one side of the moving die plate, the parallelism between the moving die plate and the fixed die plate can be prevented from being deteriorated. Further, when a molded product is held between the dies, parallelism or the like can be easily returned to the original state.

DESCRIPTION OF THE PREFERRED EMBODIMENTS

The clamping apparatus according to embodiments of the present invention will be described below with reference to the accompanying drawings.

Figure 2A:
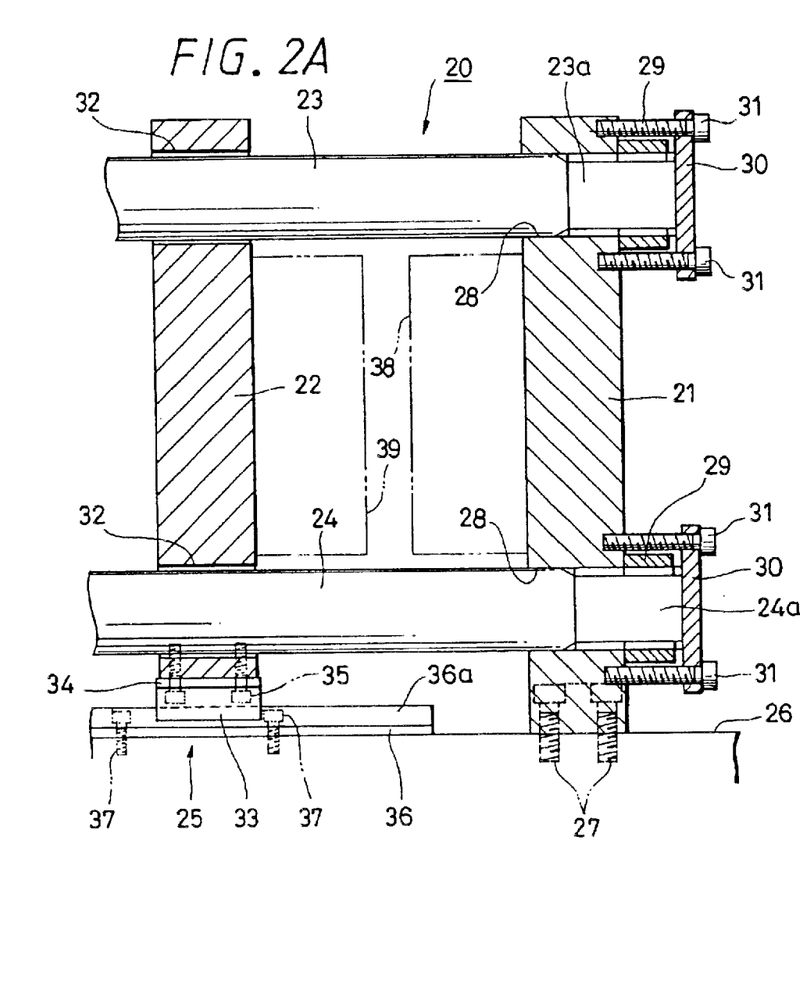
FIG. 2A is a front view showing a clamping apparatus according to a first embodiment of the present invention partly in a cross-sectional fashion.
Figure 2B:
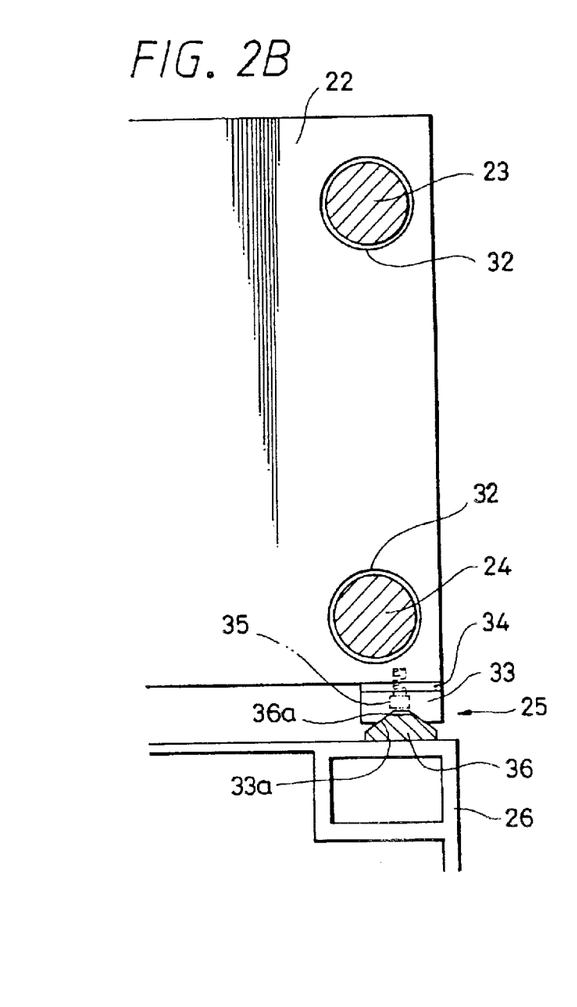
FIG. 2B is a side view showing a right-hand half of the clamping apparatus according to the first embodiment of the present invention partly in a cross-sectional fashion.
Figure 4A:
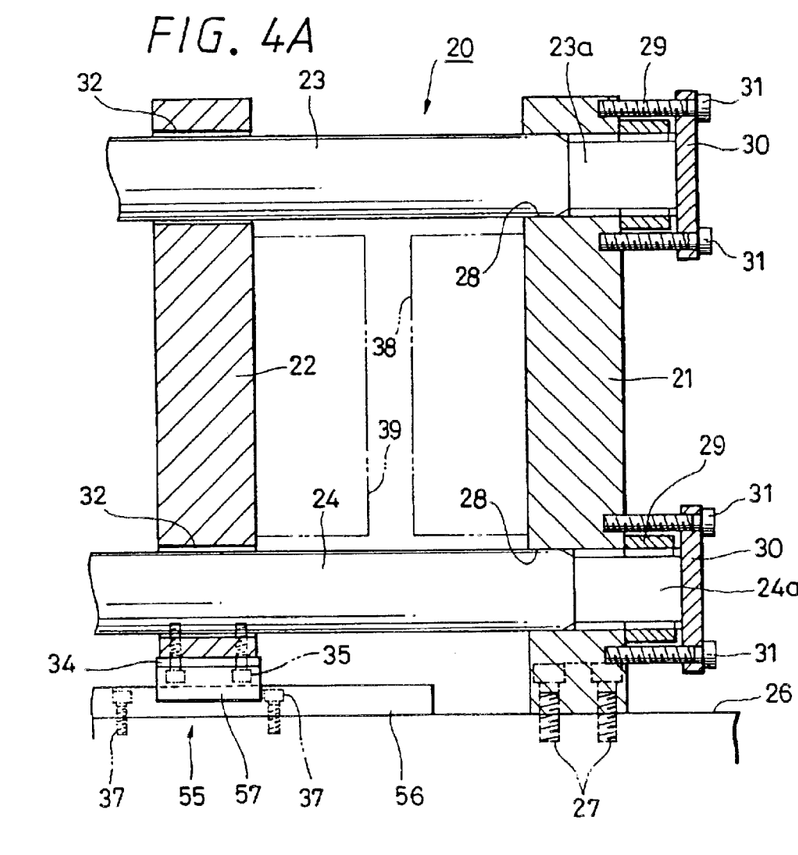
FIG. 4A is a front view showing a clamping apparatus according to a second embodiment of the present invention partly in a cross-sectional fashion.
Figure 4B:
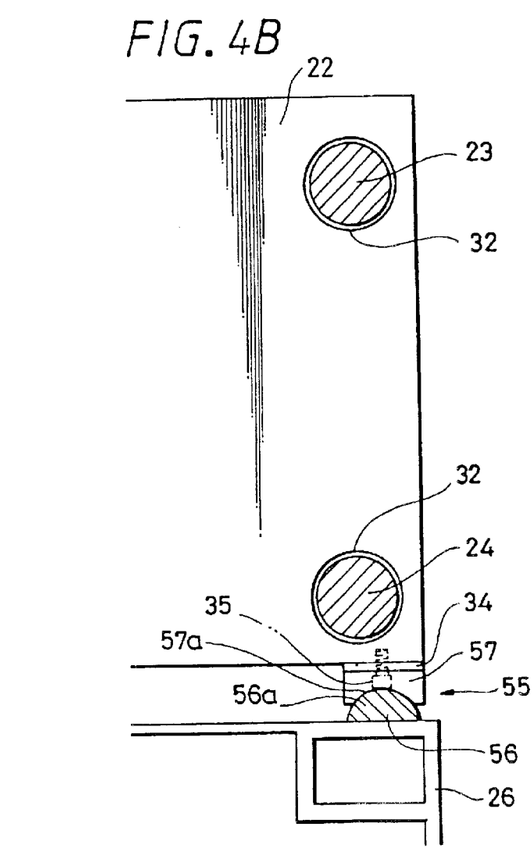
FIG. 4B is a side view showing a right-hand half of the clamping apparatus according to the second embodiment of the present invention partly in a cross-sectional fashion.
Figure 5A:
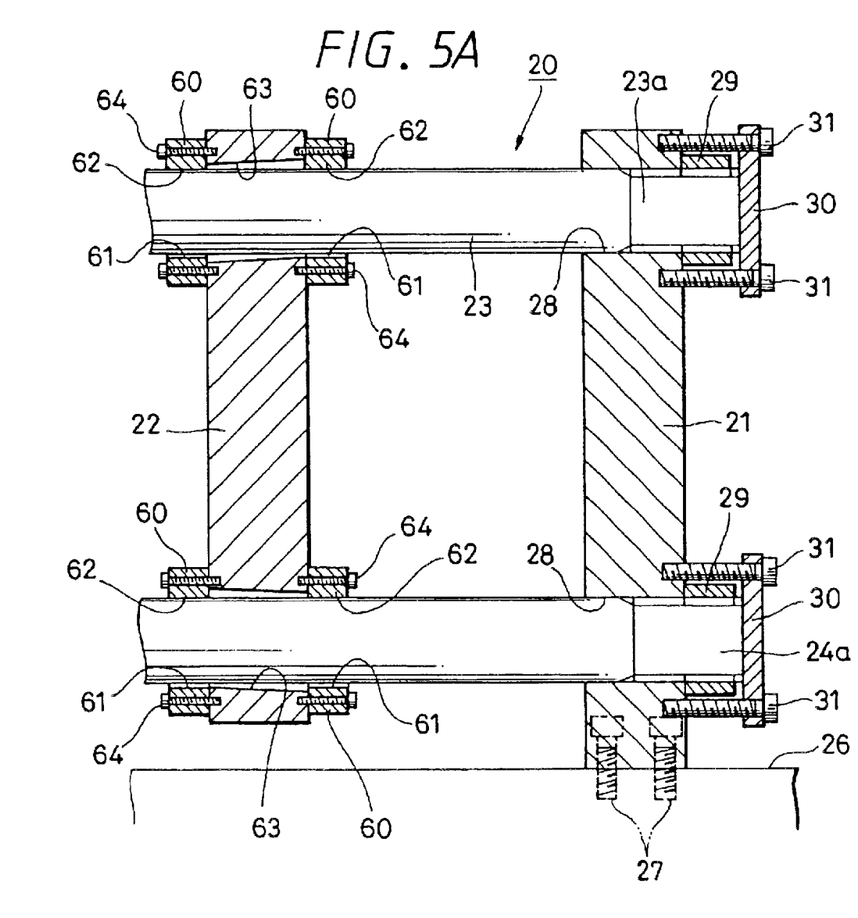
FIG. 5A is a front view showing a clamping apparatus according to a third embodiment of the present invention partly in a cross-sectional fashion.
Figure 5B:
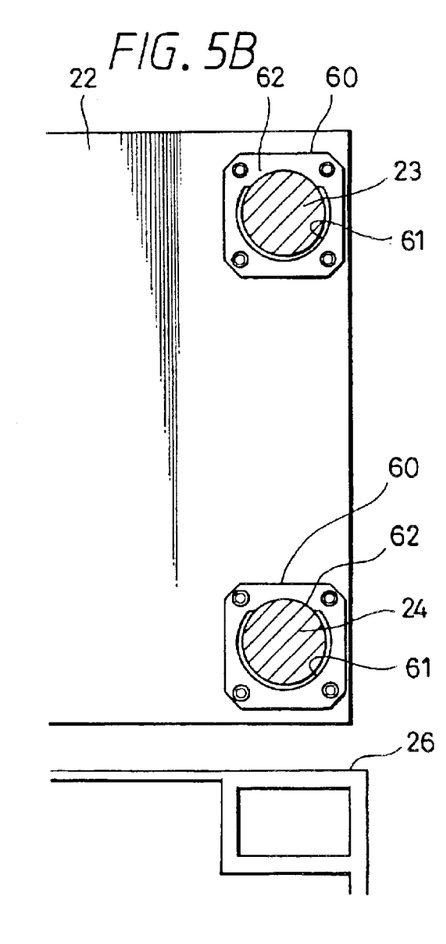
FIG. 5B is a side view showing a right-hand half of the clamping apparatus according to the third embodiment of the present invention partly in a cross-sectional fashion.
Figure 6:
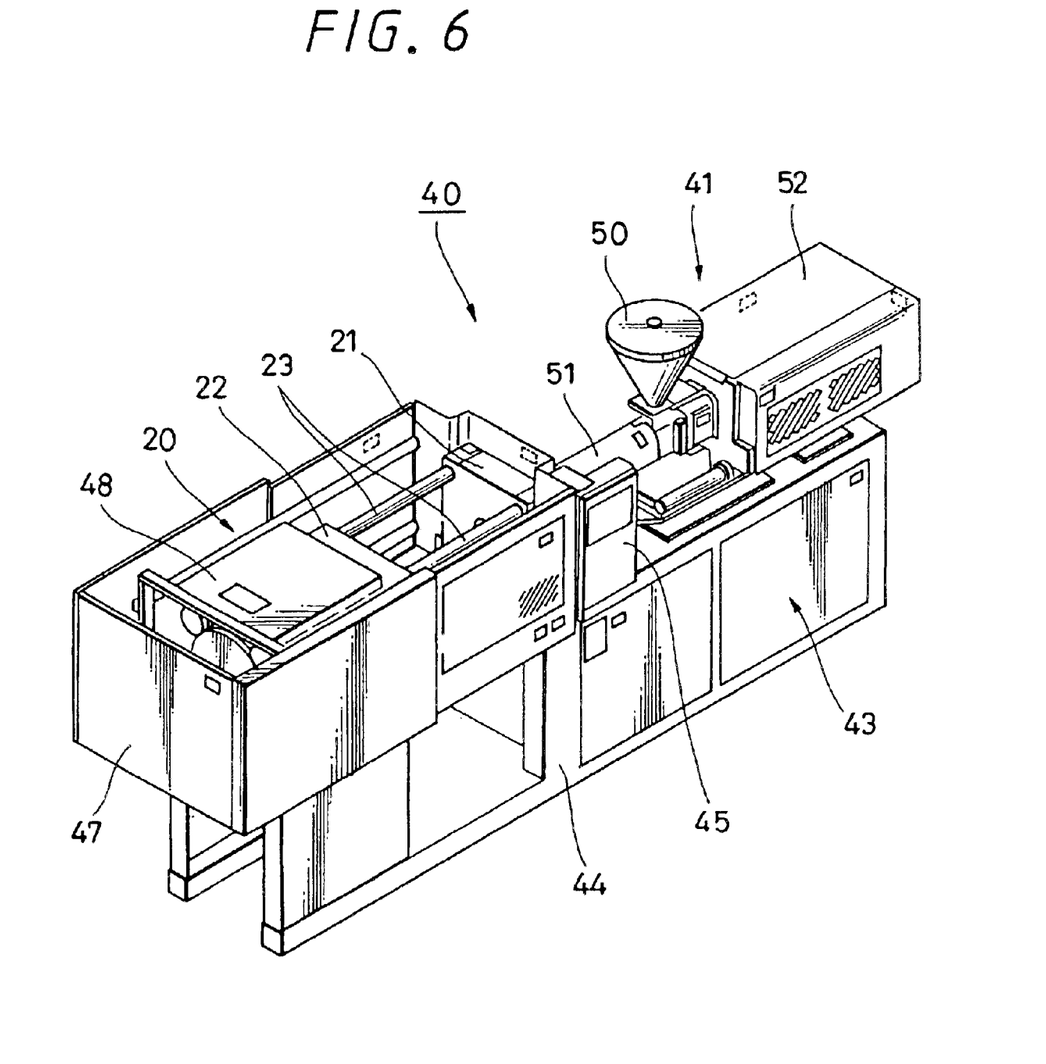
FIG. 6 is a perspective view showing an injection-molding machine for use with the inventive clamping apparatus according to an embodiment of the present invention.

FIGS. 2A, 2B to FIG. 6 show embodiments of the present invention. Specifically, FIGS. 2A, 2B are diagrams showing a clamping apparatus according to a first embodiment of the present invention. FIGS. 3A, 3B are diagrams to which reference will be made in explaining actions of the clamping apparatus shown in FIGS. 2A, 2B. FIGS. 4A, 4B are diagrams showing a clamping apparatus according to a second embodiment of the present invention. FIGS. 5A, 5B are diagrams showing a clamping apparatus according to a third embodiment of the present invention. FIG. 6 is a perspective view showing an injection-molding machine for use with the inventive clamping apparatus according to an embodiment of the present invention.

As shown in FIGS. 2A, 2B, a clamping apparatus according to a first embodiment of the present invention comprises a fixed die plate 21, a moving die plate 22, totally, four tie rods of upper and lower two tie rods 23, 24 and two first guide means 25.

The fixed die plate 21 is composed of a square plate-like or block-like member erected on the upper surface of a frame 26 the upper surface of which is made flat and fixed to the frame 26 by a plurality of fixing screws 27. The fixed die plate 21 has insertion holes 28 extending through its thickness direction defined at its four corners. The tie rods 23, 24 are inserted into the insertion holes 28, respectively. The tie rods 23, 24 have screw portions 23a, 24a formed at their one ends, and tip end portions of the respective screw portions 23a, 24a project from one surface of the fixed die plate 21. Fixing nuts 29 are screwed down on the tip end portions of these screw portions 23a, 24a.

Further, fixed plates 30 are brought in contact with projected ends of the respective tie rods 23, 24. Each fixed plate 30 is formed of a plate material larger than the fixing nut 29 and has a plurality of through-holes (more than three through-holes should preferably be provided) defined at its portion outside the fixing nut 29. Attachment screws 31 are respectively inserted into the through-holes, and tip end portions of the respective attachment screws 31 are screwed down on tapped holes tapped on one surface side of the fixed die plate 21. Then, by clamping the attachment screws 31, the inner surface of the fixed plate 30 is brought in contact with the end faces of the side of the screw portions 23a, 24a of the tie rods 23, 24, respectively.

The four tie rods 23, 24 are formed of round bar-like members whose outer circumference surfaces are finished smooth, are parallel to each other and are extended in the horizontal direction, respectively. The respective tie rods 23, 24 extend through the moving die plate 22 in the thickness direction and the other ends thereof are engaged with the members of the frame 26 side and thereby fixed.

The moving die plate 22 is formed of a square plate-like or block-like member whose size is approximately similar to that of the fixed die plate 21 and has insertion holes defined at its four corners. Bushes 32 are engaged with the respective insertion holes of the moving die plate 23, and the tie rods 23, 24 are inserted into the respective bushes 32. The moving die plate 22 has attached at respective ends in the lateral direction of its lower surface shift sliders 33, which show specific examples of a second member comprising one of the first guide means 25 showing a first specific example of the guide mechanism.

Specifically, according to the first embodiment, the guide mechanism composed of the two first guide means 25 comprises the moving die plate 22 such that the moving die plate 22 may move close to or away from the fixed die plate 21. The respective shift sliders 33 of the two first guide means 25 are distant from each other with a predetermined interval in the lateral direction on the lower surface of the moving die plate 22 and are fixed to the lower surface of the moving die plate 22 by a plurality of fixing screws 35 through the adjustment plate 34.

The shift slider 33 is composed of a block-like member with a guide recess portion 33a formed of a V groove-like recess portion formed thereon. The directions in which V-like grooves of the respective guide recess portions 33 continue are set to be parallel to the axial directions of the four tie rods 23, 24. The distance in which the shift slider 33 may proceed is set to be slightly longer than the length of the moving die plate 22 in the thickness direction.

The two guide rails 36 engaged with the shift sliders 33 and which show the specific examples of the first members comprising the other members of the first guide means 25 are respectively fixed to the upper surface of the frame 26 by a plurality of fixing screws 37 (the guide means 25 disposed on the left-hand half and on the left-hand side of the moving die plate 22 is not shown in FIG. 2B). The pair of guide rails 36 is disposed in parallel to each other with a spacing corresponding to the pair of shift sliders 33. Each guide rail 36 has formed at its upper portion a guide projection portion 36a of a wedge-like projection portion that engages with the guide recess portion 33a formed of the V groove-like recess portion of the shift slider 33.

The surface on which the guide recess portion 33a of the shift slider 33 and the guide projection portion 36a of the guide rail 36 are brought in contact with each other is finished by a suitable method, such as scraping, so that the shift slider 33 can easily slide along the guide rail 36 with high accuracy. As the materials of the shift slider 33 and the guide rail 36, there can be used oil-impregnated metals, ceramics, quenched metals or other materials. Then, it is preferable that, according to the need, a suitable means to supply a lubricant such as grease or lubricating oil to the above contact surface, such as a grease nipple or an oil well cap, should be attached to the shift slider 33.

Although not shown, the moving die plate 22 has joined thereto a clamping mechanism for moving this moving die plate 22 close to or away from the fixed die plate 21.

As such clamping mechanism, there can be applied a direct-pressure type clamping mechanism, a toggle type clamping mechanism, a cam-lock type clamping mechanism and the like that are known as general mechanisms in the technical field of clamping apparatuses. These clamping mechanisms are well-known technologies and, therefore, need not be described.

The fixed die plate 21 has a fixed-side die 38 fixed to its surface opposing the moving die plate 22. Then, the moving die plate 22 has a moving-side die 39, which makes a pair with the fixed-side die 38, fixed to its surface opposing the fixed die plate 21.

In practical use, the clamping apparatus 20 having the above arrangement is employed by the injection-molding machine 40 shown in FIG. 6, for example. A fundamental arrangement of the injection-molding machine 40 comprises the clamping apparatus 20, an injection apparatus 41, an electronic control apparatus 43, a frame 44 and the like. The frame 44 is shaped as an oblong square housing-like base. The clamping apparatus 20 is mounted on one side of the upper surface of the frame 44, and the injection apparatus 41 is mouted on the other side of the upper surface of the frame 44. The frame 44 has disposed at its central portion a control panel 45 that has a large number of operation buttons, a display and the like attached thereon.

In this injection-molding machine 40, there are shown the fixed die plate 21 of the clamping apparatus 20, the moving die plate 22 opposing the fixed die plate 21 in the lateral direction, two upper tie rods 23 (the lower two tie rods 24 are not shown) for supporting the moving die plate 22 so that the moving die plate 22 can slide freely, the clamping mechanism 48 for moving the moving die plate 22 forward or backward along the four tie rods 23, 24 and the like. The clamping mechanism 48 is adapted to open and close the die and clamp the die upon injection and is generally operated by a suitable means, such as a hydraulic cylinder or a servo motor.

The injection apparatus 41 is adapted to plasticize and calculate molding materials and to inject the molding materials into the die. This injection apparatus 41 is composed of a hopper 50 for storing and supplying raw materials, a heating cylinder 51 for heating supplied raw materials until the raw materials are melted, an injection cylinder 52 including a screw to inject melted raw materials into the die and the like. The screw is propelled to inject melted raw materials into the die by a suitable means, such as a hydraulic cylinder or a servo motor.

Actions of the clamping apparatus 20 that composes the injection molding machine 40 having the above arrangement will be described below, for example. When the clamping mechanism 48 of the clamping apparatus 20 is operated as the injection-molding machine 40 is activated, an operation force is applied to the moving die plate 22 so that the moving die plate 22 is guided by the four tie rods 23, 24 and the two first guide means 25 and, thereby, is moved close to the fixed die plate 21.

In this case, approximately the whole of the weight of the moving die plate 22 is applied to the two first guide means 25, and the weight of the moving die plate 22 that is applied to the four tie rods 23, 24 is zero or extremely small. In consequence, since the tie rods 23, 24 are prevented from flexing as the moving die plate 22 moves, the two first guide means 25 can guide the moving die plate 22 so that the moving die plate 22 can move smoothly.

Next, when the moving die plate 22 moves a predetermined amount as the clamping mechanism 47 is activated, the moving-side die 39 fixed to one surface of the moving die plate 22 is fitted into the fixed-side die 38 fixed to the opposng surface of the fixed die plate 21. Accordingly, after the injection apparatus had been activated to inject and fill the melted material into the die, the melted material is cooled and solidified, and thereby a target molded product can be obtained.

Thereafter, the clamping mechanism 48 is operated in the opposite direction to move the moving die plate 22 away from the fixed die plate 21, whereby the moving-side die 39 is detached from the fixed-side die 38 to open the die. Next, after the molded product had been ejected from the die by the ejector, the injection-molding process is completed.

In this case, heat generated from the die is conveyed to the moving die plate 22, the fixed die plate 21 and the tie rods 23, 24, so that the moving die plate 22, the tie rods 23, 24 and the like are thermally expanded by such heat. However, almost all of the weight of the moving die plate 22 is applied to the two first guide means 25, and a load applied from the moving die plate 22 to the tie rods 23, 24 can be prevented from increasing considerably. Accordingly, even when the moving die plate 22 is deformed by influences such as heat conveyed from the die and a pitch between the bushes is changed by thermal expansion, the moving die plate 22 can move smoothly.

Figure 3A:
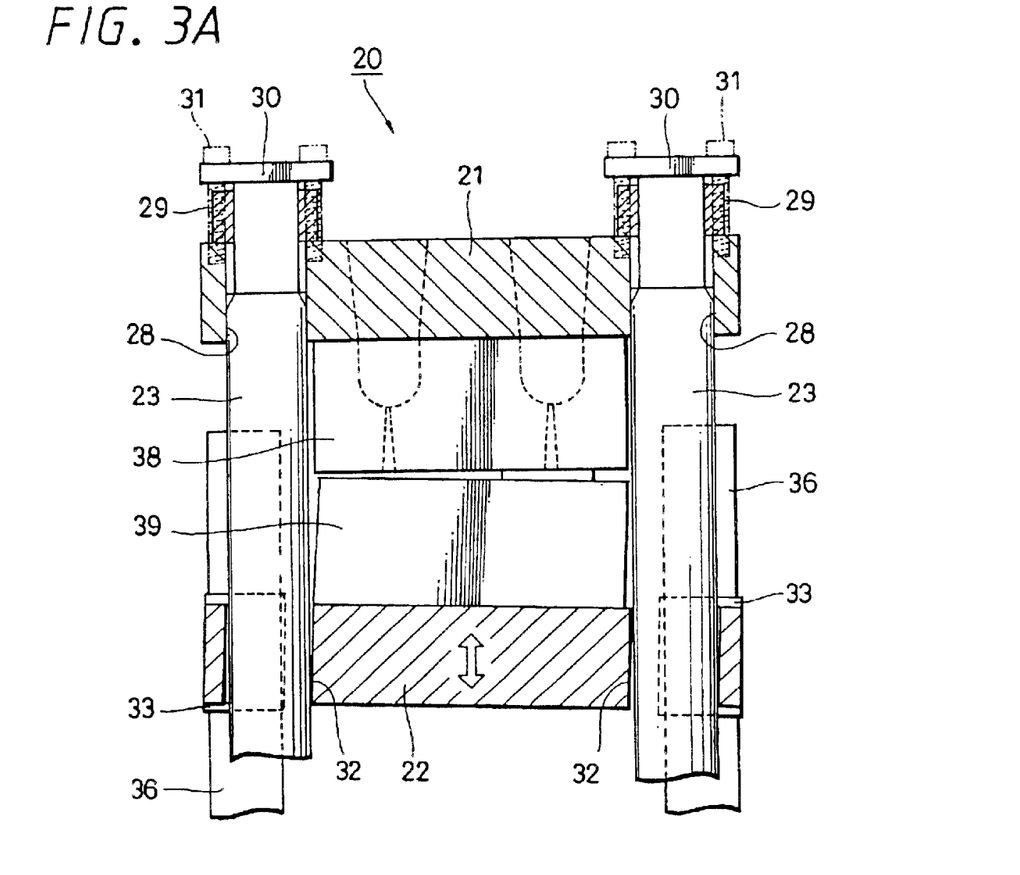
FIG. 3A is a plan view showing the clamping apparatus according to the first embodiment of the present invention partly in a cross-sectional fashion and to which reference will be made in explaining the state in which parallelism is deteriorated.
Figure 3B:
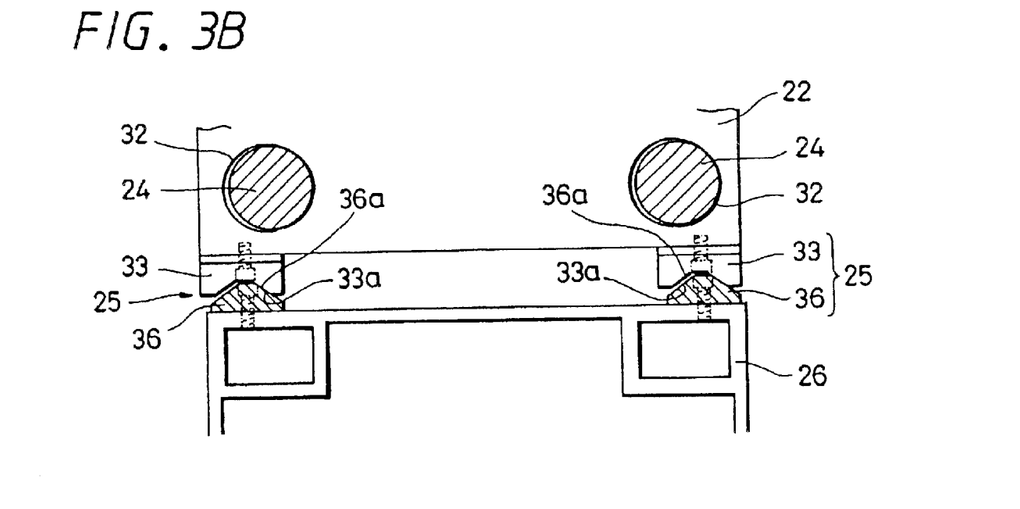
FIG. 3B is a side view showing a lower half of the clamping apparatus according to the first embodiment of the present invention partly in a cross-sectional fashion.

Upon such injection molding, as shown in FIG. 3A, for example, the molding material is unbalanced, injected and filled into one side of the die with the result that the molding material is filled into a space between the fixed-side die 38 and the moving-side die 39. In this case, as shown in FIG. 3B, the inclined surface of one side of the guide recess portion 33a of the shift slider 33 is lifted relative to the guide projection portion 36a of the guide rail 36, whereby the parallelism of the moving die plate 22 relative to the fixed die plate 21 is deteriorated.

However, even though the parallelism of the moving die plate 22 relative to the fixed die plate 21 is once deteriorated, when the die is opened after the molded product had been ejected from the die, the weight of the moving die plate 22 causes the guide recess portion 33 to follow the guide projection portion 36a, so that the parallelism of the moving die plate 22 relative to the fixed die plate 21 can return to the original parallel state shown in FIGS. 2A, 2B. Consequently, the parallelism of the moving die plate 22 relative to the fixed die plate 21 need not be adjusted one more time, and hence the injection molding work can be continued without a break.

Accordingly, the deterioration of the operating ratio can be suppressed to the minimum. Further, when a molded product is sandwiched between the dies, influences exerted upon the component, such as the die or the like, can decrease, and damages on the component, such as the die, can be alleviated. Further, as compared with the case in which the related-art LM guide is in use, the costs of assemblies can decrease, and it is possible to provide an inexpensive guide mechanism.

While the two first guide means 25 support the moving die plate 22 according to the first embodiment as described above, the number of the first guide means 25 used therein is not limited to two. Only one guide means 25 may be sufficient, and more than three first guide means 25 may be used to support the moving die plate 22. When only one first guide means 25 is in use, the first guide means 25 is set to the underside of the center of gravity of the moving die plate 22.

With respect to the arrangement of the first guide means 25, while the shift slider 33 has the V groove-like guide recess portion 33a and the guide rail 36 has the wedge-like guide projection portion 36a that engages with the guide recess portion 33a according to the first embodiment as described above, the present invention is not limited thereto, and it is needless to say that the shift slider 33 may have a guide projection portion formed thereon and the guide rail 36 may have a guide recess portion formed thereon.

FIGS. 4A and 4B show a second embodiment of the present invention and illustrate the case in which a first guide means according to the second embodiment is employed. The second embodiment differs from the above-mentioned first embodiment only in a first guide means 55, and the rest of arrangement thereof is the same as that of the first embodiment. Therefore, in FIGS. 4A, 4B, elements and parts identical to those of FIGS. 2A, 2B to FIGS. 3A, 3B are denoted by identical reference numerals and need not be described. Only the first guide means 55 will be described below in detail.

While the first guide means 55 is not composed of different assemblies and is composed of a guide rail 56 serving as a first member and a shift slider 57 serving as a second member, their guide projection portion and guide recess portion have different shapes.

As shown in FIGS. 4A, 4B, the guide rail 56 is a semicircular rail member whose semicircular cross-section continues in the longitudinal direction. The upper portion of the guide rail 56 serves as a semicircular guide projection portion 56a. In response to the shape of the guide projection portion 56a of the guide rail 56, the shift slider 57 has formed thereon a guide recess portion 57a of a semicircular groove having a semicircular cross-section that detachably engages with the guide projection portion 56a. Similar effects to those of the first embodiment can be achieved by the first guide means 55 having the above-mentioned arrangement.

FIGS. 5A, 5B shows a third embodiment of the present invention and illustrate the case in which a second guide means according to the first embodiment is employed. The third embodiment differs from the above-mentioned first and second embodiments only in a second guide means 60, and the rest of arrangement of the third arrangement is similar to that of the first and second embodiments. Therefore, in FIGS. 5A, 5B, elements and parts identical to those of FIGS. 2A, 2B to FIGS. 4A, 4B are denoted by identical reference numerals and need not be described. Only the second guide means 60 will be described below in detail.

The second guide means 60 are composed of guide bushes that engage with the tie rod 23 (or 24), and two guide bushes 60 are used as a set. The two guide bushes 60 engage with one tie rod 23 (or 24), and, totally, eight guide bushes 60 of four sets support the moving die plate 22.

The guide bush 60 is formed of a plate-like bearing member that has a through-hole 61 extending at its central portion. The through-hole 61 is a round hole larger than the outer diameter of the tie rod 23 (or 24). On the upper portion of the through-hole 61 and which is the upper side of the guide bush 60, there is provided a pressure reception portion 62 that projects toward the inside of the radius direction. The pressure reception portion 62 engages with the tie rod 23 (or 24) and projects in a range of approximately ¼ of the through-hole 61. The radius of curvature of the pressure reception portion 62 is set to be substantially the same as the radius of the tie rod 23 (or 24).

The two guide bushes 60 having the above-mentioned arrangement are attached to the moving die plate 22 so as to oppose the insertion holes 63 bored at four corners of the moving die plate 22. The two guide bushes 60 are located under the pressure reception portions 62 and hold the moving die plate 22 at their respective sides, so as to make their holes coincide with each other. The respective guide bushes 60 are respectively fixed to both surfaces of the moving die plates 22 by a plurality of fixing screws 64 (four fixing screws 64 in this embodiment).

In the third embodiment, the tie rods 23 (or 24) are inserted into the four insertion holes 63 of the moving die plate 22, and the pressure reception portions 63 of the two guide bushes 60 are brought in contact with the respective tie rods 23, 24. Therefore, the inner peripheral surface of the insertion hole 63 can be prevented from contacting with the outer peripheral surface of the tie rods 23, 24. Then, the weight of the moving die plate 22 is applied to the respective tie rods 23, 24 through the two guide bushes 60. Accordingly, a quarter of the weight of the moving die plate 22 is applied to the respective tie rods 23, 24.

The third embodiment also can achieve similar effects to those of the above-mentioned first embodiment, and the four tie rods 23, 24 can guide the moving die plate 22 so that the moving die plate 22 can move forward and backward smoothly. Further, as shown in FIGS. 3A, 3B, even when the parallelism state between the moving die plate 22 and the fixed die plate 21 grows worse, if the die is opened and closed after the molded product had been ejected from the die, then in the respective tie rods 23, 24, the curved surface portions of the upper surfaces thereof can be corrected so as to follow the pressure reception portions 62 of the guide bushes 60. As a consequence, owing to its weight, the moving die plate 22 returns to the original state and, hence, the parallelism state thus deteriorated can be corrected automatically.

While the four second guide means 60 in which the two guide bushes 60 make a pair constitute the guide mechanism according to the third embodiment as described above, the guide mechanism can be composed of at least two second guide means 60. Preferably, the guide mechanism may be composed of more than three second guide means 60 and can be composed of more than five second guide means 60. Further, while the two guide bushes 60 are used in response to the respective insertion holes 63, the present invention is not limited thereto, and one guide bush 60 may be used in response to the respective insertion holes 63.

While the present invention has been described so far with reference to the accompanying drawings, the present invention is not limited to the above-mentioned embodiments. For example, while the present invention is applied to the clamping apparatus that uses the four tie rods 23, 24 as described above, the number of tie rods used therein may be two or three, and the present invention can be applied to a clamping apparatus that uses more than five tie rods.

As set forth above, according to the clamping apparatus of the present invention, in the clamping apparatus including the fixed die plate, a plurality of tie rods, the moving die plate and the clamping mechanism, since the guide mechanism supports the moving die plate downwardly or upwardly and allows the moving die plate to move in the opposite direction of gravitation, even when a load is applied to one side of the moving die plate, the parallelism between the moving die plate and the fixed die plate can be prevented from being deteriorated. Further, when the molded product is held by the die, the parallelism can be easily returned to the original state.

Accordingly, the parallelism state of the moving die plate relative to the fixed die plate need not be adjusted one more time, and the injection molding work can be executed continuously so that the deterioration of the operating ratio can be suppressed to the minimum. Further, when the molded product is held by the die, influences exerted upon the die can decrease and damages on the die and the like can be alleviated. Furthermore, as compared with the case in which the related-art LM guide is in use, the costs of assemblies can decrease. Hence, there can be provided the clamping apparatus that includes the inexpensive guide mechanism.

Having described preferred embodiments of the invention with reference to the accompanying drawings, it is to be understood that the present invention is not limited to those precise embodiments and that various changes and modifications could be effected therein by one skilled in the art without departing from the spirit or scope of the invention as defined in the appended claims.

What is claimed is:

1. A clamping apparatus comprising:

a fixed die plate fixed to a frame;

a plurality of tie rods extending in the horizontal direction and respectively supported to said fixed die plate in parallel to each other;

a moving die plate supported to said plurality of tie rods such that said moving die plate can slide freely;

a clamping mechanism for moving said moving die plate forward and backward along said plurality of tie rods;

a guide mechanism for downwardly or upwardly supporting said moving die plate and allowing said moving die plate to move in the opposite direction of gravitation;

and wherein said guide mechanism includes two first guide means composed of a combination of a first member having a wedge-like or semicircular projection portion and a second member having a V-like or semicircular recess portion that engages with said projection portion and one of said first member and said second member of said first guide means is fixed to said moving die plate and the other is fixed to said frame.

* * * * *